May 14, 1929.  G. W. CROSS  1,712,874
AUTOMOBILE RADIATOR REPAIR AND TEST APPARATUS
Filed Aug. 8, 1927  2 Sheets-Sheet 1
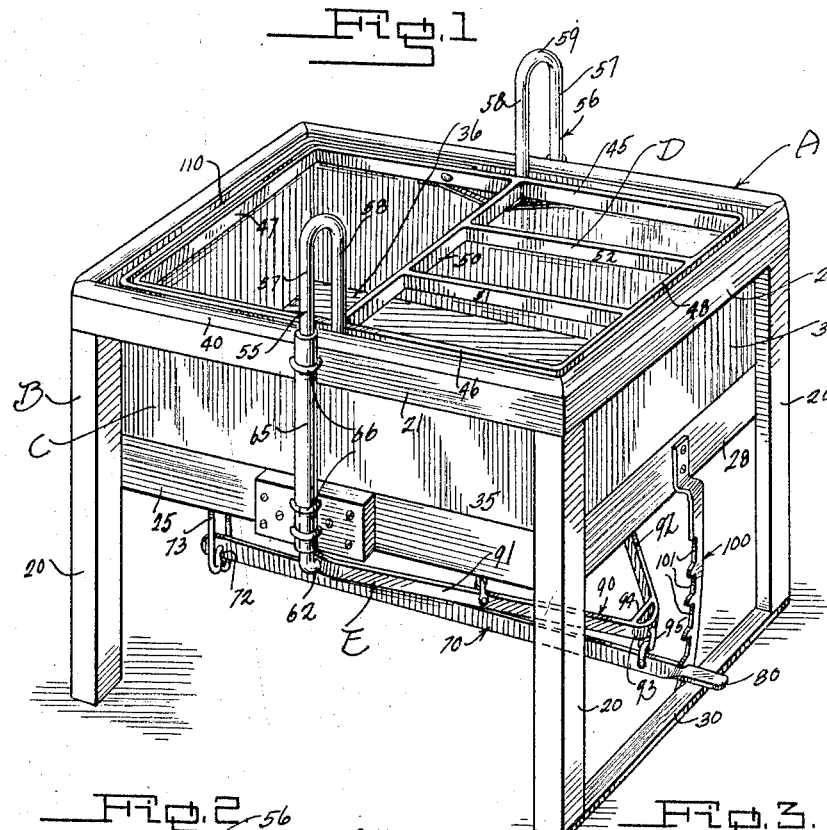
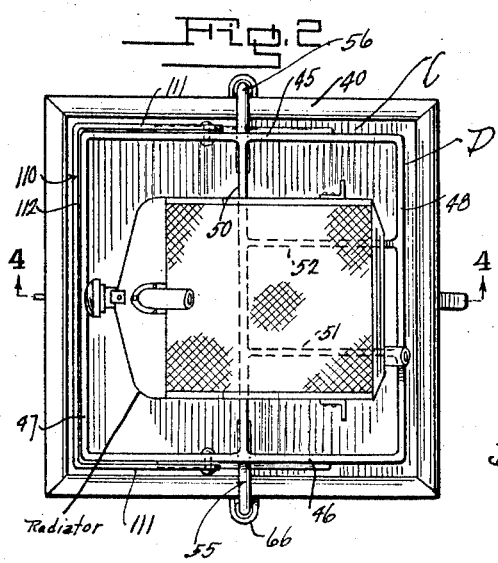
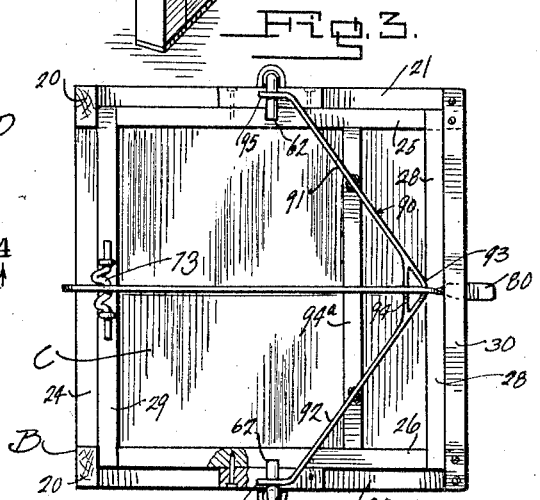
Inventor
George W. Cross
By Lancaster and Allwine
Attorney

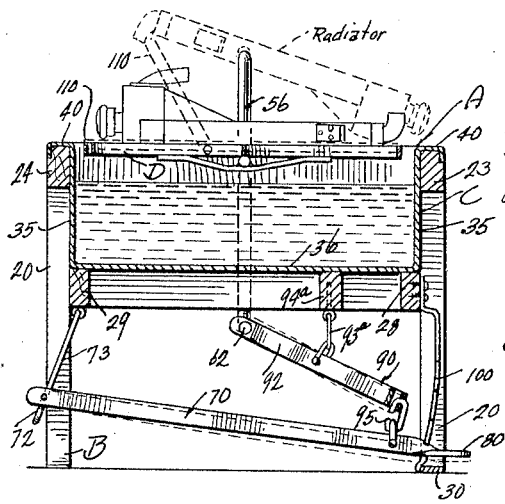
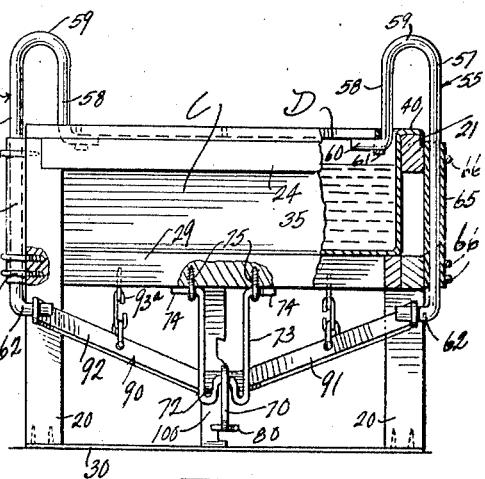
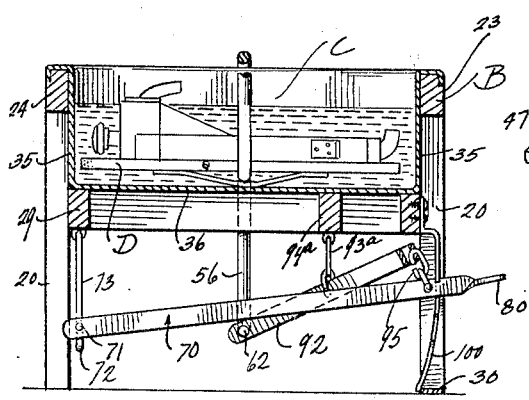
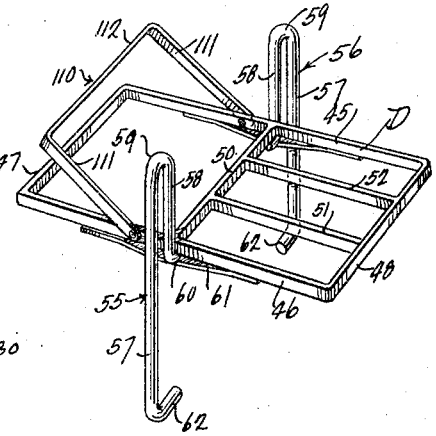
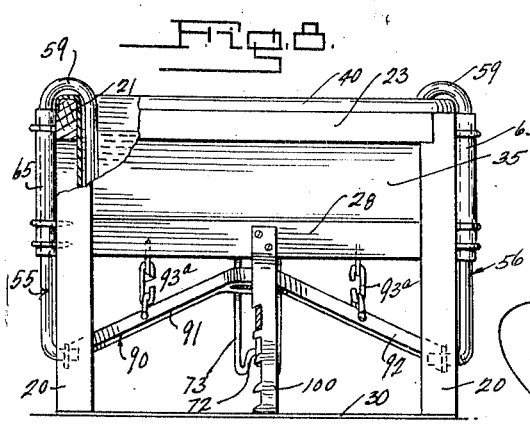

Patented May 14, 1929.

1,712,874

UNITED STATES PATENT OFFICE.

GEORGE W. CROSS, OF NASHVILLE, TENNESSEE.

AUTOMOBILE RADIATOR REPAIR AND TEST APPARATUS.

Application filed August 8, 1927. Serial No. 211,600.

This invention relates to an improved automobile radiator repair and test device.

The primary object of this invention is the provision of a practical type of automobile radiator repair and testing apparatus which may be used in automobile repair shops and the like for supporting an automobile radiator thereon, while the same is being repaired, and so that the radiator may with ease be lowered after the repair operation into an adjacently associated top or tank of water, and therein tested.

A further object of this invention is the provision of novel means associated with a tank full of water for adjustably associating a radiator above the tank of water so that the same may be repaired and with facility lowered into the tub of water for testing the same in a manner well known in the art.

A further object of this invention is the provision of an automobile radiator repair device including a tank adapted to receive water having a tray associated therewith and supported in a novel manner by exterior means which will enable an easy elevation or lowering of the radiator on the tray, with respect to the tub of water.

Other objects and advantages of this invention will be apparent during the course of the following detailed description.

In the accompanying drawings, forming a part of this specification, and wherein similar reference characters designate corresponding parts throughout the several views, Figure 1 is a perspective view of the improved apparatus.

Figure 2 is a plan view of the improved apparatus showing the same supporting a radiator for repair.

Figure 3 is a bottom plan view of the improved device.

Figure 4 is a transverse sectional view taken substantially on the line 4—4 of Figure 2, showing the rack thereof supporting a radiator above a tank of water.

Figure 5 is a rear end view of the improved device, showing parts thereof in section.

Figure 6 is a cross sectional view similar to Figure 4, but with the rack lowered to submerge the radiator in a body of water for testing.

Figure 7 is a perspective view of the radiator supporting rack.

Figure 8 is a front elevation of the improved device.

In the drawings, wherein for the purpose of illustration is shown only a preferred embodiment of the invention, the letter A may generally designate the improved device, which may consist of a supporting frame B having a tank or tub C supported thereby and having associated therewith a radiator supporting tray D adjustably mounted on the frame B, with respect to the tank, by means E.

Referring to the frame B, the same preferably consists of vertical corner supporting legs 20 having top side rails 21 and 22 and front and rear cross rails 23 and 24 respectively connected at the tops of said legs 20. Lower side cross rails 25 and 26 are connected below the rails 21 and 22 respectively, at the inner sides of said legs, attached in any approved manner thereto, and cross front and rear braces 28 and 29 are also provided, suitably connected between the ends of the legs 20 and below the top, front and rear rails 23 and 24 respectively, as shown in Figures 4 and 5 of the drawings, for a purpose to be more fully set forth, in supporting the tank C. These horizontal side, front and rear upper and lower sets of rails are rigidly attached to the legs 20 and adapted to hold the framework together for supporting the tank C. The lower ends of the front corner legs may be connected by means of a bottom horizontal floor piece 30, best shown in Figure 1 of the drawings, which cooperates with the tank supporting and adjusting mechanism E to be subsequently described.

The receptacle or tank C is preferably of sheet metal, of any approved character, although preferably copper, including the side and front walls 35, suitably secured together. A bottom 36 is provided integral or otherwise sealed at the lower edges of the side and front walls 35, and the top of the receptacle C is open, and the tops of the side and front walls 35 are flanged outwardly and downwardly in hook-shaped manner as shown at 40 in Figure 4 of the drawings, and hooked in a morticed relation over the tops of the front, rear and side rails 21, 22, 23 and 24, as shown in the various figures of the drawings. The tank has a compartment therein of a depth necessary to submerge automobile radiators when supported on the tray D, as shown in Figure 6 of the drawings.

The tray D is best illustrated in Figure 7 of the drawings and includes the side rails 45 and 46, connected at their ends by cross rails 47 and 48. Connecting the intermediate portions of the side bars 45 and 46 substantially midway between the end rails 47 and 48 is a cross rail 50, which forms an end support for a pair of longitudinal bars 51 and 52 paralleling the side bars 45 and 46 and placed therebetween, as shown in Figure 7 of the drawings. The material of which the side rails and bars of the frame D are formed is preferably of rectangle cross section stock, with the ends bent to the form shown and described, or soldered in place. The supporting rack D is very strong and entirely open at one side of the cross rail 50 with the support rails 51 and 52 to the opposite sides, to best cooperate in supporting the radiator of an engine, as conventionally shaped, and as shown in Figure 2 of the drawings supported on the rack.

Goose-neck shaped guide posts 55 and 56 are provided at opposite sides of the rack D, each of which includes a relatively long body 57 having a shorter body 58 connected therewith at a bight 59; the bodies 57 and 58 being parallel, and the shorter portion 58 having its lower end soldered or otherwise secured at 61 at about the location of the middle cross brace 50. These guide posts 55 and 56 are of course placed at opposite sides of the rack D, and the portions 57 thereof are spaced from the portions 58 and extend from the upper side of the plane of the rack D to below thereof for a considerable distance, and have inturned right angled ends 62 at the lower ends thereof.

As shown in the drawings, the rack D is adapted to be positioned in the compartment of the tank C, with the goose neck guide posts 55 and 56 straddling the opposite side rails 21 and 22 of the frame B, and so positioned that the shorter legs 58 will operate above and within the compartment of the tank C, and with the longer legs 57 slidably mounted in suitable supporting sleeves 65, fixedly mounted at 66 at the opposite sides of the frame B, as shown in Figure 5 of the drawings. These guide sleeves 65 are vertically positioned with passageways therethrough so that the side legs or bodies 57 slidably extend entirely therethrough and so that the lower right angled ends 62 thereof are inturned below the lower rails 25 and 26 of the frame B, as well shown in Figure 3 of the drawings.

As to the means for elevating and lowering the rack D, the same includes a swingable and pivoted lever 70, shown in Figure 6 of the drawings, as being pivoted at 71 to the crank end 72 of an oscillating steel supporting bracket 73 which at its upper end is outturned at 74 and bears in suitable eyes 75 detachably supported on the lower rail 29 of the frame B, as shown in Figures 3 and 5 of the drawings. This supporting bracket 73 is preferably of steel rod material, and is doubled upon itself to provide the crank portion 72 well shown in Figure 5, to which the one end of the lever 70 is connected. The opposite end of the lever 70 extends beyond the plane of the opposite side of the frame B from the side to which the same is pivoted, and there has a turned end 80, which provides a foot tread.

In cooperation with the foot lever 70 is a novel V-shaped connecting link 90, best shown in Figure 3 of the drawings, including arms 91 and 92 connected at 93 and there provided with a cross brace 94 and there having a link connection 95 with the foot lever 70 adjacent the foot tread portion 80 thereof, and entirely remote from the swinging bracket 73 to which the foot lever is pivoted. The opposite ends of the arms 91 and 92 are apertured and pivoted at 95, to the inturned ends 62 of the slidable rack supporting posts 55 and 56, as illustrated in the various views of the drawings. The arms 91 and 92 are pivoted at 93$^a$, intermediate their ends to a cross beam 94$^a$ of the frame B. With this arrangement of the foot operating lever 70 placed along the medial line of the frame B below the bottom of the tank C, about midway between the side rails 25 and 26, as shown in Figure 3, with its swinging bracket connection, and the link frame connection 90 with the lower ends of the posts 55 and 56, the rack D may be operated with facility notwithstanding that the same supports an eccentric weight of a radiator thereon. In other words the rack D has an equalized balance and notwithstanding the location of the radiator thereon, the foot lever may be operated with ease.

Between the front cross rail 28 and the bottom cross piece 30, as shown in Figure 1, there is a substantially vertically disposed toothed rack 100, connected at its upper and lower ends to the rail and cross pieces 28 and 30 respectively, and at one side having notches 101, to receive the free end of the foot operating lever 70 therein, as shown in Figure 1 of the drawings. In lieu of the notches 101 suitable ratchet teeth may be provided on the rack 100 to serve the same purpose.

As to the general structural arrangement when the foot lever 70 is in the lowermost notch 101 or below the lowest tooth, it is to be noted that the foot tread portion 80 extends beyond the front of the device A for facile placement of the operating foot thereon, and in this position the rack D is located in a plane about flush with the top of the device A, as shown in Figure 4 of the drawings. While in this position there is still room for the operator to depress the foot lever 70 still further so that the rack D may be elevated above the top of the tank, to permit an operator to insert his fingers between one end of the rack and the side walls of the frame B, to lift up a supporting brace 110, best shown in Figure 7 of the drawings, being of U-shape, including side legs 111 pivoted at similar ends on the side bars 45 and 46 of the rack D to one side of the plane of the supporting posts 55 and 56, the arms 110 being suitably connected by a cross support 112, as shown in Figure 7, which is adapted to receive the radiator in resting relation thereagainst. The brace 110 is pivoted with sufficient friction against the side bars 45 and 46 that it will hold the position into which it is moved. The cross brace 112 normally collapses beyond the end rail 47, with the side arms 111 at the outer sides of the side bars 45 and 46, as shown in Figure 1, so that the U-shaped brace 110 may be elevated from such position to support a radiator in any of various positions such as shown in the dotted position of Figure 4, and so that the operator may most conveniently work upon the same.

The rack D is elevated when the foot lever 70 is supported against the lower tooth of the lowermost notch of the toothed rack 100, as shown in Figure 1 of the drawings, and in this position the radiator may be supported on the rack D above the body of water in the tank C, as shown in Figure 4, and the operator may work thereon for soldering or performing other operations. When it is desired to test the radiator for leaks, the lever 70 is released from the rack 100, and the supporting rack D is lowered into the body of water, as shown in Figure 6, for submerging the radiator and testing the same in a manner well known to those skilled in the art.

Various changes in the shape, size, and arrangement of parts may be made to the form of invention herein shown and described, without departing from the spirit of the same or the scope of the claims.

I claim:

1. In a device of the class described a supporting frame construction including a tank having an open top, a radiator carrier, posts associated with the carrier at opposite sides of the frame, means on the frame for guiding said posts in a rectilinear line for elevating and lowering the carrier within said tank, a foot operated lever pivoted on said frame, a substantially V-shaped connecting member connected at one end to the lever remote from its pivoted end, the connecting link at its opposite end being connected to the ends of said posts, means connecting said V-shaped member for rocking movement on said frame between its ends, and detent means associated with the foot lever to hold the same in various positions at its free end.

2. In a radiator repair and testing unit, a tank, a frame construction supporting the tank, a radiator carrier vertically movable within the tank, means on the frame for guiding the vertical movement of said carrier in the tank, said means including slidable members at opposite sides of the tank, a foot lever, a swinging frame pivotally supporting the foot lever at one end below the frame between said last mentioned members, a substantially V-shaped connecting link including arms connected at similar ends and diverging therefrom, the arms at their connecting ends having a pivotal link association on the foot lever at the end thereof opposite the pivotal end of the lever, means pivoting each of said arms on the frame between the ends thereof, said arms at their diverging ends being connected one to each of said members of the carrier, and detent means associated with the foot lever to hold the same at its swinging end in a desired relation on the frame for maintaining the carrier in an elevated or lowered relation with respect to the frame.

3. In a device of the class described a frame, a tank supported by the frame, a radiator carrier movable into or out of the tank, goose neck members rigid with the carrier straddling the same at the top thereof, and including bodies disposed at opposite sides of the frame, sleeves on the frame guiding said bodies of the goose necks, and means connected with the frame and bodies of the goose necks for elevating and lowering the goose necks to move said carrier with respect to the tank.

GEORGE W. CROSS.